Figure 1:
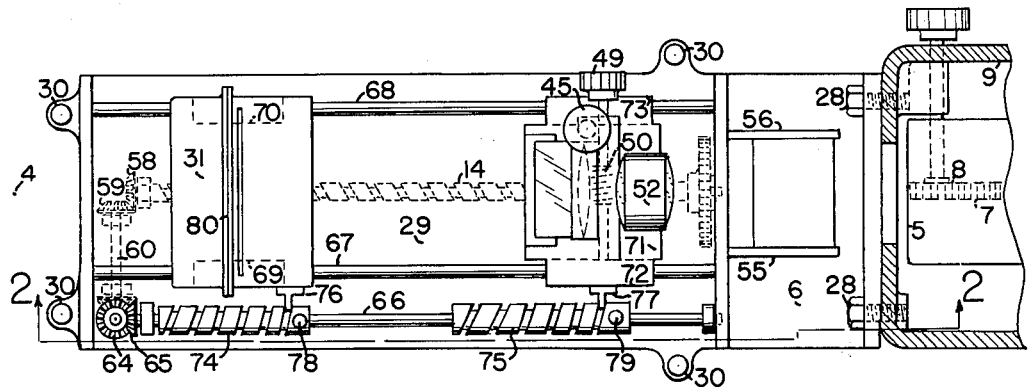

July 10, 1956        J. B. WALKER        2,753,758

OBLIQUE IMAGE SUPERIMPOSITION PROJECTION DEVICES

Filed Dec. 31, 1953        2 Sheets-Sheet 1

INVENTOR.

JOSEPH B. WALKER

BY *Harry R. Lubcke*

AGENT

July 10, 1956  J. B. WALKER  2,753,758
OBLIQUE IMAGE SUPERIMPOSITION PROJECTION DEVICES
Filed Dec. 31, 1953  2 Sheets-Sheet 2

INVENTOR.
JOSEPH B. WALKER
BY Harry R. Lubcke
AGENT

United States Patent Office 2,753,758
Patented July 10, 1956

2,753,758

OBLIQUE IMAGE SUPERIMPOSITION PROJECTION DEVICES

Joseph B. Walker, Los Angeles, Calif.

Application December 31, 1953, Serial No. 401,647

19 Claims. (Cl. 88—24)

My invention relates to means for optically superimposing and adjusting plural images upon a surface. More particularly, the images of two intimately associated optical systems are superimposed upon a working area without elements of one optical system interfering with the optical path of the other.

In the modern arts of motion pictures, television and special photography the need for a skillful solution to the long standing optical problem of image superimposition becomes more pressing as these arts mature. Superimposition effects catch the public eye and have an economic value far above what would be assessed on scientific grounds alone. Notwithstanding, the value thereof is directly measured by the excellence of the optical result and illusions which lack realism cannot be tolerated.

The prior art has sought to solve the problem by utilizing a partially silvered mirror. This has been disposed at an angle in one optical system to combine the image light flux from the other. The directions of the resulting optical paths near the surface upon which the images have been superimposed have been collinear.

By this invention I am enabled to form high quality superimposed images over optical paths which are oblique one to the other and which converge toward each other as the surface upon which the superimposition is accomplished is reached. This makes elements common to both optical systems unnecessary. Even with advanced techniques utilizing the partially silvered mirror a light loss of one-third in the optical system in which any light loss is undesirable must be endured. A slight loss of definition because of the presence of a slanting sheet of glass in that optical system with which to accomplish the combining is another imperfection.

An object of my invention is to provide means for superimposing images from optical systems having mutually exclusive elements.

Another object of my invention is to provide an image superimposition system having maximum light efficiency.

Another object of my invention is to accommodate a desirable configuration of elements in an image superimposition system by altering an image in a manner inverse to the alteration impressed upon it by said configuration.

Another object of my invention is to provide a versatile and compact structure for superimposing optical images.

Another object of my invention is to provide an optical path in a superimposition optical system characterized by a prism and an oblique mirror which forms an image in a plane at an angle to said path.

Another object of my invention is to provide a superimposition optical system capable of superimposing a magnified image of a selected portion of a given field of view upon an image of that field of view.

Another object of my invention is to provide plural superimposition attachments having different characteristics and capable of facile attachment to a main optical system.

Another object of my invention is to provide a superimposition optical system capable of wide and automatic adjustment.

Figure 2:
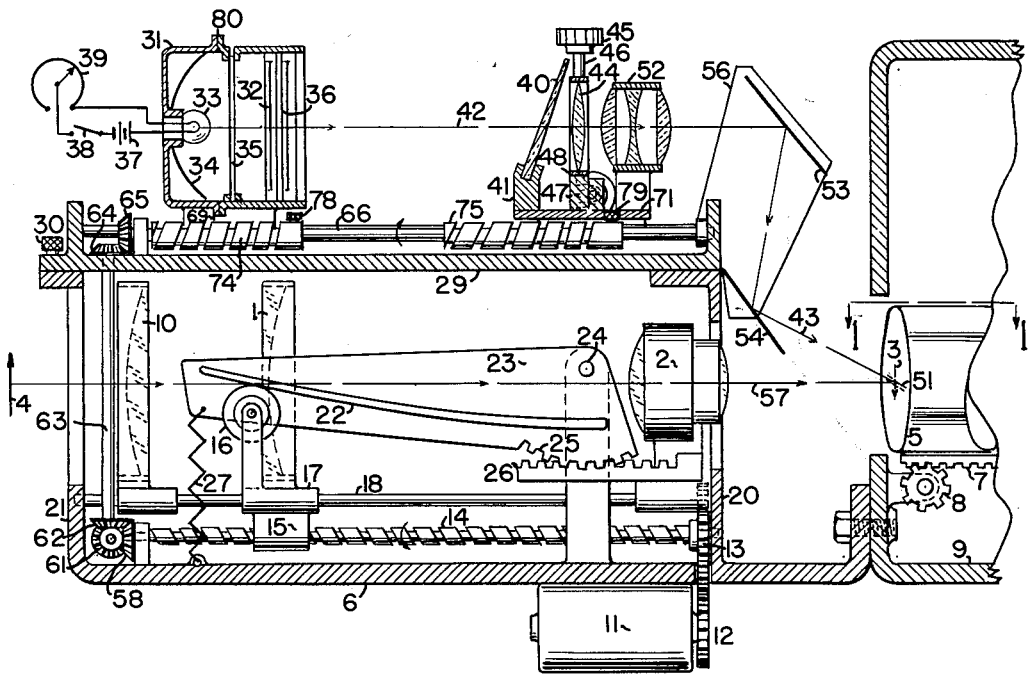
Figure 3:
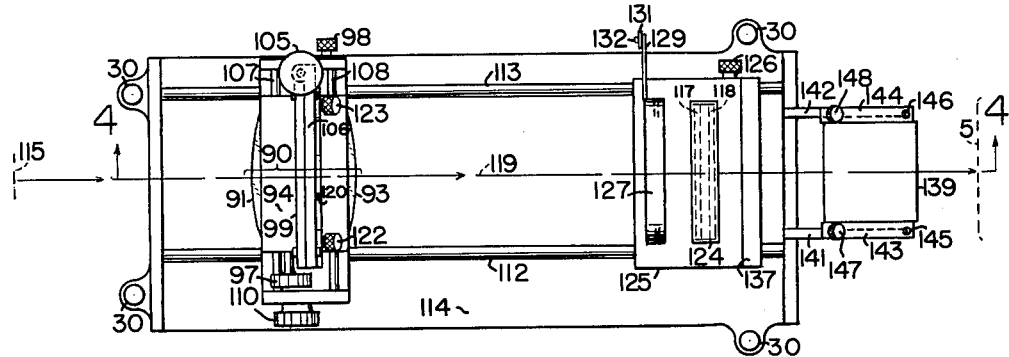
Figure 4:
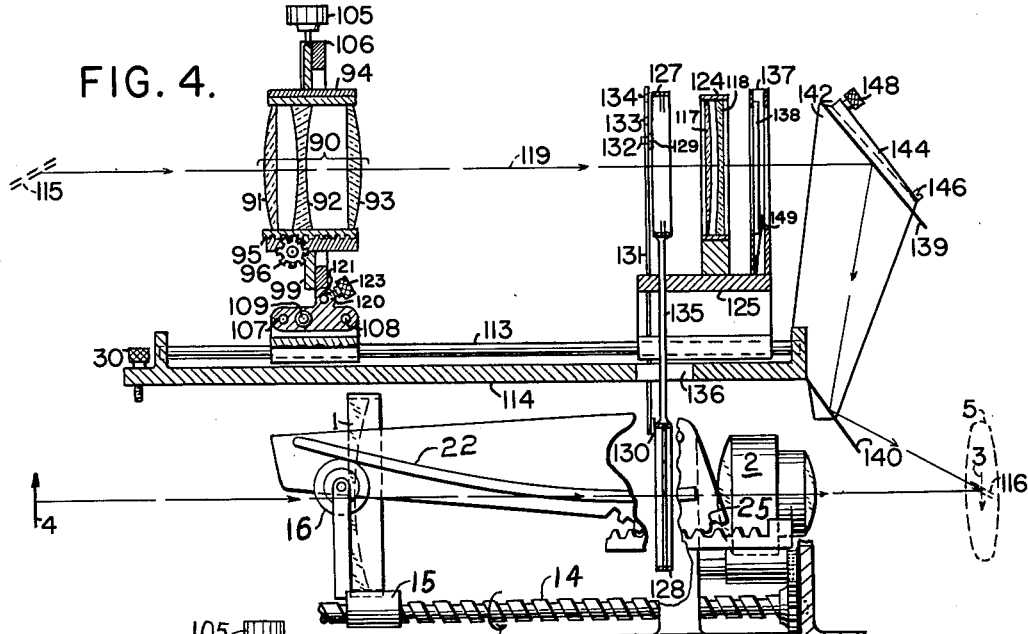
Figure 5:
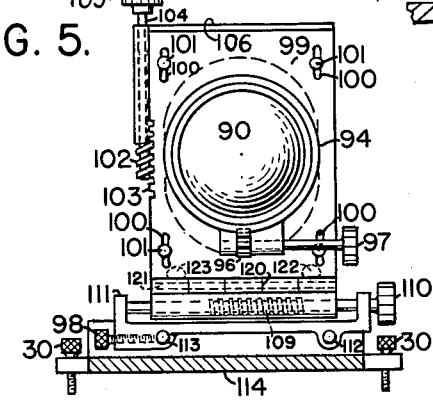

Other objects of my invention will become apparent upon reading the following detailed specification and upon examining the related drawings, in which:

Fig. 1 shows my invention arranged to superimpose transparencies, this being a plan view, Fig. 2 shows the same in sectional elevation, Fig. 3 shows a modification for superimposing a close-up view over a long-shot view of a scene, in plan, Fig. 4 shows the same in side sectional elevation, and Fig. 5 shows the same in front end elevtion.

In Fig. 2, numeral 1 represents the divergent primary lens of my main optical system. This coacts with a convergent secondary lens 2 to form an image 3 of object 4 located in the usual field of view. Image 3 is shown formed upon the image receiving surface 5 of a television camera tube such as the well-known photoelectric emissive or conductive types, but that surface may be a light-sensitized motion picture film, sensitized plate in a still camera, a ground glass or equivalent variants. Surface 5 is mounted upon means to allow translation thereof to and from the structure 6, which contains lenses 1 and 2, as by rack 7 and pinion 8, a combination effecting motion of surface 5 with respect to camera case 9. Other known means may be employed to obtain this focusing action and the details of the camera may vary widely and still be suitable for use with my invention.

Lenses 1 and 2 comprise the essentials of my commercially available "Electrazoom" lens, described U. S. Patents 2,506,947; 2,515,104; 2,547,187 and 2,532,685. Convex lens 10 is an additional lens employed to reduce the overall effective focal length of this optical system, desirable in most practical applications.

Briefly recounting a preferred form of Electrazoom lens for this embodiment, reversible motor 11 is energized at will by the operator to vary the magnification of image 3. Through gears 12 and 13 worm 14 is caused to revolve. Internally threaded nut 15 engages the worm and causes translatory motion of lens 1 and follower 16, these being attached to sleeve 17, one of a pair which slide upon rods 18 and 19. These rods are one behind the other in Fig. 2 and are fastened to upright portions 20 and 21 of the base structure 6. When motor 11 is actuated in one direction, cam 22 coacting with follower 16 causes an upward motion of cam plate 23 by virtue of pivot 24, and vice versa. Lens 1 having thus moved away from object 4, lens 2 is caused to move toward it by the action of gear teeth 25 formed in plate 23, these being in mesh with rack 26 attached to lens 2. A necessary compensatory motion is thereby imparted to lens 2; a reduced amplitude of travel toward lens 1 when the latter is moving away from object 4 and vice versa. Lens 2 also translates upon rods 18 and 19 or equivalent. Spring 27 insures that the cam and follower will remain in intimate contact. Base 6 is rigidly fastened to camera case 9 by cap screws 28 and 29 or equivalent. See Fig. 1.

Turning now to the superimposition optical system of my device, deck 29 is detachably mounted to the upper portion of base 6 of the main optical system so that the latter may be used alone as is often desired. Thumbscrews 30, engaging lugs as shown in Figs. 1 and 2, are provided for this purpose. Deck 29 could be constructed integral with the main base and other variations are possible. It is important that the overall structure be rigid, thereby the superimposed and the main image do not move, one with respect to the other, under conditions of mechanical vibration or shock.

In Figs. 1 and 2 apparatus is provided for producing the superimposed image from a transparency or slide. In a housing 31 is contained slide 32, a source of radiant energy, usually visual, 33, a reflector 34 to usefully direct the same, an opal glass 35 to diffuse the same, and a mask 36 which may be utilized to decrease the visual energy from selected areas of the slide. This accomplishes an effect similar to that known as "dodging" in printing photographic positives. If made of metal, a phenolic or cardboard selected areas of the slide scene are completely eliminated from the superimposed scene. If the mask is made by spraying paint on glass, or of an equivalent combination, gradual and partial reduction of intensity over the area of the superimposed image can be secured. The purpose of masking is to suit the superimposed scene to the main scene. It may be desirable to darken the doorway of the superimposed scene so that living actors in the main scene will be realistically reproduced. In my superimposition system the image intensity at any point is the sum of the intensities at the corresponding points in both the main and the superimposed scenes. Similarly, it may be desired that an item of advertising such as an automobile with a portion of road be reproduced with an indefinite boundary graduated away in intensity from the item of principal interest; this superimposed upon the main image of a baseball field, for instance.

Radiant energy source 33 is powered by battery or equivalent source 37, which is controlled by switch 38 and rheostat 39. The superimposed image may be near-instantaneously applied or removed from surface 5 by actuating the switch and the intensity thereof may be adjusted by the rheostat.

The next element in line beyond the slide-mask assembly is the wedge prism 40. The two surfaces thereof lie in planes having a divergence of a few degrees. The prism itself is held by rigid mounting 41 at an inclination of the order of seventy degrees from the center line 42, the optical axis. The thick portion of the wedge must be to the bottom as shown for the typical embodiment shown. The function of the wedge is to predistort the image from slide 32 so that the oblique incidence of the superimposition optical system to surface 5, indicated by portion 43 of the optical axis, will not result in distortion.

From the practice of optics it is known that an image of slide 32 obliquely incident as described upon surface 5 would suffer keystone distortion and non-uniformity of focus under usual techniques. The width of the image at the bottom would be definitely greater than at the top and all the objects pictured therein would have a trapezoidal appearance. In the focus of the superimposition system were adjusted for sharpness at the top of the image it would be unsharp at the bottom and vice-versa, if the focus was adjusted for sharpness at the center of the image it would be unsharp at both top and bottom. The image would be totally unusable.

In the practice of my invention I have found that the amount of trapezoidal and concomitant focal distortion to be corrected determines the angle between the glass surfaces of the wedge itself and that the inclination to the optical axis constitutes a fine adjustment to the corrections.

The next element in line is position-adjusting lens 44. This is a weak converging lens capable of being adjusted in both dimensions in a plane perpendicular to the optical axis. The focal length of this lens is of the order of seven times that of the main lens 52 located behind it. Knob 45 through shaft 46 allows worm 47 engaging a half-nut attached to lens mounting 48 to impart a precise vertical adjustment of the position of the lens. Knob 49 and worm 50 allow a similar adjustment horizontally. The image of the slide 32 upon surface 5 is identified by numeral 51. This image is moved horizontally by knob 49 and vertically by knob 45. The motion of the image is in the same direction as the adjustment.

Lens 52 is the principal lens in forming the image 51 of slide 32 upon surface 5. The exact form thereof is not critical as long as it be of photographic quality. The general characteristics of lens 52 are the same as those of lens 2, although the latter is shown with larger elements for greater speed, this being desirable in the main lens system intended for pickup of scenes by reflected light whereas the transmitted light of the superimposition optical system may easily be supplied at large intensity.

Element 53 is a mirror, preferably first surfaced, for altering the direction of the light forming the superimposed image in this embodiment as a matter of convenience. The light is reflected to a smaller similar mirror 54, inherent in any embodiment, from which the light passes to the image surface 5 according to my invention. Both mirrors are set at angles less than forty-five degrees to the vertical, though not at necessarily the same angle. In any particular embodiment the angles of the two mirrors are adjusted to give central superimposition of normal images with the position-adjusting lens in the center of both adjustments, the angle between 43 and 57, the optical axes of the two lens systems, being that for which the angle of the wedge of the prism was selected for correcting trapezoidal distortion. The area of each mirror is to be sufficient to include the full cone of light at that mirror. Both mirrors are mounted between structural plates 55 and 56, which in turn are rigidly mounted to upper deck 29.

By properly relating the motions of housing 31 and the rearward lens assembly 40—52 to the motions of Electrazoom lenses 1 and 2 I am able to cause the zoom of the superimposed image to be the same as the zoom of the image of the principal field of view. This has great practical value in the arts previously mentioned in allowing background scenes of any description to be effectively the locale of living performers located in front of a uniform dark background.

The upper deck elements are automatically adjusted as follows. The forward end of worm 14 of the main optical system is fitted with a bevel gear 58. This meshes with a similar gear 59 on cross shaft 60. See Fig. 1. A similar gear 61 on the outboard end of this shaft meshes with still another similar gear 62 which is attached to the lower end of vertical shaft 63. Attached to the upper end thereof is another bevel gear 64 which meshes with a similar one 65 on camshaft 66. This gear train may be composed of curved teeth miter gears and the bearings spring loaded to eliminate backlash.

Referring now to Fig. 1, housing 31 translates upon rods 67 and 68 by means of bushings 69 and 70. Elements 40—52 are mounted on a table 71 similarly provided with bushings 72 and 73 and similarly translatable on rods 67 and 68. Circular cams 74 and 75 are located on camshaft 66, the former opposite the housing and the latter opposite the table. Follower 76 is attached to the housing and follower 77 to the table. In this embodiment the distance from slide 32 to the optical center of the 44—52 lens combination is less than from the latter to surface 5. Thus the spirals on the two cams are in the same direction. Should the distances be reversed the spirals would be in opposite directions. The leads of the spirals change from one end to the other of the cams as shown.

From the structure recited, as motor 11 operates in one direction lenses 1 and 2 will come together and the housing and table will move away from surface 5. These motions cause both the main and the superimposed images to congruently increase in magnification upon surface 5. The opposite rotation of the motor causes reduction of the magnification, of course.

Cams 74 and 75 are affixed to shaft 66 by set screws 78 and 79, respectively. The relative positions of housing 31 and table 71 may thus be altered. Effects of unequal changes in magnification between main and superimposed images may be obtained by adjustments of these cams and subsequent setting of the screws. Manual changes in the magnification of the superimposed image may be accomplished by leaving the set screws loose and moving the housing and/or table by hand. Focus variations of the superimposed image may be similarly accomplished.

It is to be understood that enclosing side plates and a top may be fitted to this device to exclude ambient light. Also, the external shape thereof may be of a dual-cylindrical or oval cross-section as viewed from the field of view (the location of object 4). The moving elements may be driven by worms and cams positioned above rather than below these elements, or to the side.

In one embodiment, housing 31 moves the least of the automatic adjustments, elements 40—52 move about 35% more and Electrazoom lens element 1 moves over twice as much as the housing in order that in-focus and congruent changes in magnification of images 3 and 51 occur. In Figs. 1 and 2 the upper and lower deck elements are shown in approximately the position for minimum magnification and the arrows around shafts 14 and 66 indicate the direction of rotation for increased magnification.

For unusual effects slide or transparency 32 may be inserted into housing 31 at right angles to the usual erect position, or at any angle, or the whole superimposition device may be inclined at any angle to the vertical upon surface 5. The latter adjustment reorients the superimposed image, but image 3 of object 4 in the field of view is not altered because of the axial symmetry of the main optical system 10, 1 and 2. Simulated motion of the superimposed scene may be given by operating either or both knobs 45 and 49 of the position adjusting lens or by manually moving transparency 32. Moving cloud and smoke effects can be similarly obtained by suitably preparing and moving masks 36. By suitably moving a long transparency the effect of an airplane in flight with the audience as passengers may be simulated, and so on.

Motion pictures may be utilized as superimposed visual material by removing the rear portion of housing 31 at joint 80. Slides and masks are removed and the motion picture image reproduced on opal glass 35 or an equivalent positioned in the same place or in the slide or mask positions. The motion picture equipment is conventional and need not be described. Glass 35 takes the place of the screen in ordinary projection.

In the above described manner I accomplish several of the objects of my invention.

We turn now to consideration of an alternate arrangement of my invention. Rather than a different scene or advertising matter it is often desired to superimpose a magnified portion of a main scene on an image, particularly in the television art. This might be a closeup of a pitcher over the view of a considerably larger portion of a baseball field, allowing the audience to direct their attention to either the detailed actions of the pitcher or the activity of a runner and baseman at first base.

Essentially, this calls for a "telephoto" or long focal length lens to replace the greater portion of the elements on the upper deck in the previous embodiment. Specifically, however, a long focal length lens of ordinary design is to be preferred for the reason that a relatively long back focal length distance is available in my invention and the telephoto formula, seeking to greatly reduce this distance, is not necessary.

In Figs. 3 and 5 only the upper deck has been shown, since the Electrazoom lens and camera aspects are unchanged from Figs. 1 and 2. In the new figures element 90 is collectively the long focal length lens. This is here shown in the form of a triplet, comprised of component optical elements 91, 92 and 93. Simpler or more involved combinations may also be utilized depending upon the required treatment of aberrations. It is highly desirable that this lens be adjustably mounted with respect to the main optical system defined by lenses 1 and 2. This is so that the portion of the field of view to be superimposed may be selected by the operator and also to overcome the effect of parallax between the two optical systems for objects close to the camera. I have found that a transverse translatory motion is best adapted for this adjustment.

In Figs. 3, 4 and 5 lens 90 is enclosed in cylinder 94 and provided with rack 95, pinion 96 and knob 97 for focusing. Cylinder 94 is integral with plate 99, which is adjustable vertically by virtue of slots 100 and screws 101. The adjustment is accomplished by worm 102 engaging rack 103 cut in plate 99, the worm being actuated through shaft 104 from knob 105; manually. Plate 99 is attached to support 106, the latter having a vertically elongated hole to allow the recited vertical movement of cylinder 94. Support 106 is, in turn, supported on rods 107 and 108 for horizontal lens movement, this being effected by worm 109 engaging corresponding threads in support 106, knob 110 controlling. Rods 107 and 108 are attached to cradle 111, which in turn has sleeves surrounding main rods 112 and 113. Set thumbscrew 98 fastens the cradle at roughly the correct focal distance for the long focal length lens. The particular object in the field of view reproduced by that lens is identified by numeral 115 and the image thereof on surface 5 by 116.

When a long focal length lens is employed in my oblique superimposition arrangement it is found that image 116 is elongated vertically. This I overcome according to my invention, but with different corrective elements than I employed in the embodiment of Figs. 1 and 2.

In Figs. 3 and 4 element 117 is a plano-convex cylindrical lens having a focal length several times that of long focal length lens 90 and element 118 is a plano-concave cylindrical lens having a longer focal length than lens 117. The net effect of the two cylindrical lenses is, therefore, converging in the vertical plane and of no effect in the horizontal plane. The combined lens consequently has radially asymmetric properties in mutually perpendicular planes containing the optical axis 119, as does a prism. Cylindrical lens elements 117 and 118 are mounted in a suitable retaining frame 124, which in turn is mounted on table 125 for suitable translatory adjustment along optical axis 119. This adjustment is set by thumb set screw 126.

The next optical element in line is a double iris, provided to accomplish dissolves from long focal length lens to Electrazoom and also to balance image brightness between lenses. Irises 127 and 128 may be substantially identical. Actuating levers 129 and 130 are attached to common arm 131 in opposite extreme positions so that one iris is fully open when the other is fully closed. Arm 131 is provided to accomplish a simultaneous alteration of state of closure. The operator merely grasps it and moves it up or down to shift from one lens open to the other.

There are frequent occasions when the irises should be manipulated separately. To make this possible a pin 132 connects the upper lever to the arm 131. By springing the two apart the operator may manipulate the levers separately. A series of holes 133, 134, etc. are provided for the pin so that different ratios of closure may be obtained by the simple expedient of engaging the same in the proper hole. The upper iris is mounted on table 125 and a rigid extension 135 extending downward through slot 136 positions the lower iris in front of and adjacent to lens 2 of the Electrazoom system.

Frame 137 is a mask holder, mask 138 being held therein in an appropriate slot as has been previously described. The mask is provided in order to restrict the extent of the superimposed image in a desirable manner. In the example of the pitcher superimposed upon the baseball field the extent of the field around the pitcher must be restricted in order that irrelevant objects not be included. Numerous patterns for the boundary of the superimposed field can be obtained by utilizing opaques with definite boundaries or a glass and spray-paint gradation boundary for the mask. All boundaries of the image will have an artistic indefiniteness because the mask is removed from the plane of image formation at surface 5. Table 125 is translatable upon rods 112 and 113 for limited adjustment of placement of the optical elements mounted thereon. Set screw 126 fixes the table at any adjustment.

First surface mirrors 139 and 140 are essentially the same as mirrors 53 and 54 before, though of somewhat greater extent to insure handling the full cone of the long focal length lens 90. Supports similar to 55 and 56 are employed, although other means are here added to allow placement of the superimposed scene in any part of the main scene on surface 5. Support plates 141 and 142 are used as before but mirror 139 is fastened to two angles 143 and 144. These are attached to the plates by screws 145 and 146. Thumb screws 147 and 148 elevate the angles from the top edges of the plates and in this way the angle of mirror 139 may be altered the required limited amounts in either of two dimensions. The mirror is thick and the usual skill of the mechanic is utilized in the matter of tolerances and fits so that the mirror is not distorted in adjusting. A similar arrangement may be employed for mirror 140 but this is not usually required. Other adjustment of the position of the portion of the superimposed image utilized is had by moving the mask 138 in holder 137. Spring 149 retains the slide in the position selected.

As an additional factor in treating the oblique superimposition image I employ a small vertical downward tilt of main lens 90 to secure uniform focus over the area of image 116. For this purpose support 106 is hinged at 120, being provided with pins 121, to allow this vertical adjustment. The tilt is relatively fixed for a considerable working range of object to lens distances. Thumb set screws 122 and 123 lock the adjustment.

Upper deck 114 is fastened to the main frame of the Electrazoom lens 6 (Fig. 2) by thumb screws 30 as before. In providing plural attachments for the Electrazoom lens I accomplish an object of my invention.

Also as before, suitable side and top plates may be fastened to this long focal length modification to exclude ambient light. Furthermore, vertical adjustment of image placement in the embodiment of Figs. 1 and 2 may be obtained by providing the adjustable mirror assembly 143—148 shown in Figs. 3 and 4 for mirror 53 in Figs. 1 and 2. This is instead of or in addition to adjustment 45 of lens 44.

In the drawing of Fig. 2 the sectional plane is in front of cams 74 and 75 for these cams and below, but shifts above the center line thereof to optical axis 43 for the upper deck optical elements so that these may be detailed in section.

Modifications may be made in the size, proportions, shape and arrangement of parts in my device without departing from the spirit of my invention.

Having thus fully described my invention and the manner in which it is to be practiced, I claim:

1. In an image superimposition device, in order, a diverging lens, a coaxially related converging lens, and an image surface disposed perpendicularly to a first optical axis defined by said lenses, electromechanical means for coaxially moving said diverging lens, cam means connected between said diverging lens and said converging lens for concurrently moving said converging lens, said motions increasing the magnification of said image upon said surface when said lenses move toward each other, auxiliary lenses having an auxiliary optical axis parallel and adjacent to said first optical axis for forming a second image upon said image surface superimposed upon the image formed by said diverging lens and said converging lens, a first plane mirror upon said auxiliary optical axis to reflect light from said auxiliary lenses toward said first optical axis at an acuate angle, a second plane mirror between but lying away from said auxiliary and said first optical axes for receiving the light reflected from said first plane mirror and reflecting said light at an obtuse angle to said image surface, an optical element upon said auxiliary axis between said auxiliary lenses and said first plane mirror, said optical element having astigmatic optical properties in the direction of the plane including said first optical axis and said auxiliary optical axis, the magnitude of the astigmatism of said optical element related to the angle of the light reflected from said second plane mirror to said image surface with respect to said image surface, said astigmatism resulting in a substantially anastigmatic second image formed upon said image surface.

2. In an image superimposition device, a housing, a spaced diverging and converging lens combination for forming an image on an essentially plane surface disposed perpendicularly to the optical path defined by said combination within said housing, means for coaxially adjusting the distance between said lenses to alter the magnification of said image, a separate plurality of lens elements for forming a second image upon said surface superimposed upon the first said image, an optical element having radially asymmetric properties in mutually perpendicular planes which also contain the optical axis defined by said separate plurality of lens elements, said element in the optical path of said lens elements, a plane mirror also in said path for reflecting said path at an acuate angle, said separate plurality of lens elements, said optical element and said mirror slidably attached to said housing coextensively with respect to said diverging and converging lens combination and having an optical axis parallel to that of said combination, a second plane mirror in said reflected optical path for reflecting the same at an obtuse angle, said second plane mirror positioned beyond said optical path defined by said combination and with respect to said surface to cause the secondly reflected optical path of said lens elements to impinge said surface at an acute angle to said optical path defined by said combination, the magnitude of the asymmetry of said optical element being determined by the said last above acute angle, and said optical element and said plane mirrors disposed in said optical path such that the intersections of the surfaces thereof produced and of the surfaces of said plane mirrors, produced, are parallel lines in space, the recited position of said second mirror allowing an obstructed range of magnification adjustment of said diverging and converging lens combination.

3. The superimposition device according to claim 2 wherein the optical system for forming the second image on said surface includes a mask for limiting the configuration of said second image independent of the limiting aspects of the optical elements forming said second image.

4. The superimposition device according to claim 2 wherein the optical system for forming the second image on said surface includes a mask of varying opacity over the area of said second image for altering the intensity of said second image over the area thereof in a manner independent of the intrinsic nature of said second image.

5. In an image superimposition optical system, spaced diverging and converging lenses for forming an image of a field of view upon an essentially flat surface, means for coaxially adjusting the distance between said diverging and converging lenses, a plurality of lenses having an axis parallel to the axis defined by said spaced diverging and converging lenses, for forming an image of a second field of view superimposed upon said first image, a wedge prism disposed at an oblique angle in one dimension to the optical axis defined by and located therealong adjacent said plurality of lenses for inserting an optical obliquity thereinto, a plane mirror upon the optical axis defined by said plurality of lenses located farther therealong than said prism and lying at an angle to that optical axis, a second plane mirror positioned adjacent said surface without but adjacent to the optical path defined by said spaced diverging and converging lenses and oblique to the optical path defined by said plurality of lenses, said latter optical path from said second plane mirror to said surface being oblique to said surface, said inserted obliquity causing an image to be formed geometrically similar to said second field of view and of uniform focus over said surface, the recited position of said second plane mirror allowing an unobstructed range of magnification change by adjusting the distance between said diverging and converging lenses.

6. In an image superimposition optical system, a primary lens and a coaxially related secondary lens, means to move said lenses coaxially with respect to one another, a slide, means to illuminate said slide, a prism on the side of the slide opposite said means to illuminate, plural lenses adjacent said prism on the side thereof away from said slide, plural mirrors, one mirror adjacent said lenses on the side thereof away from said prism, another mirror adjacent said secondary lens but out of the optical path defined by said primary and secondary lenses, an approximately flat surface, said surface positioned on a continuation of said optical path beyond said secondary lens and substantially normal to said path, an image of said slide formed by said plural lenses and reflected by said mirrors appearing upon said same surface area via a second optical path impinging upon said surface at an angle to the optical path first mentioned, said prism oriented to present the longer path within said prism to the light from said slide having the shorter path from said other mirror to said surface, the recited position of said other mirror allowing unobstructed coaxial motion of said primary and secondary lenses.

7. In an image superimposition optical system, a first optical path for forming a first image of a field of view upon a flat surface, an illuminated transparency, a first converging lens for forming an image of said transparency superimposed upon said first image upon said surface, a second converging lens of longer optical focal length than said first converging lens positioned between said first converging lens and said transparency, means to transversely adjust the position of said second converging lens with respect to said first converging lens to correspondingly alter the position of said image formed by said first converging lens upon said surface, an asymmetric prism and reflective surfaces disposed in the optical axis defined by said converging lenses to render an optical asymmetry to the cross-section of the optical path surrounding said axis such that said axis impinges said surface at an angle other than normal thereto and said image formed thereon by said converging lenses is symmetrical and geometrically similar to the geometry of said transparency.

8. An image superimposition device comprising a diverging lens and a converging lens for forming an image of a field of view upon a substantially flat surface, means to simultaneously move both said lenses to change the magnification of said image, a transparency, means to illuminate said transparency, a prism having asymmetric optical properties with respect to illumination intercepted from said transparency, plural symmetrical converging lens elements, plural reflecting means positioned to reflect illumination from said transparency having passed through said plural lens elements, the last in order of said reflecting means positioned with respect to said priorly recited optical elements related to said transparency and with respect to said surface that the path of illumination to form an image of said transparency upon said surface impinges upon said surface at an acute angle to the normal to said surface and upon an area thereof common to said first image, the asymmetry introduced by said prism related to the direction and magnitude of said acute angle so that a symmetrical image of said transparency is formed upon said surface, and means to translate said transparency and said plural symmetrical converging lens elements simultaneously with and in such relation to the motion of the first said lenses that a corresponding change in the magnification of the image of the transparency upon said surface also occurs.

9. In an image superimposition device, a diverging and a converging lens combination for forming an image of a field of view upon a substantially flat surface, a second converging lens having a different focal length than said combination for also forming an image of different extent of said field of view upon said surface, means to adjust the relative positions of said combination and said second converging lens to alter the portions of said field of view imaged by each, a cylindrical lens in the optical path of said second lens, a reflecting element disposed in said path beyond said cylindrical lens, a second reflecting element also in said path as previously reflected, said reflecting elements oriented to reflect said path obliquely to said surface, the focal length of said cylindrical lens and the obliquity of said path to said surface being so related that the former cancels the image distortion occasioned by the latter.

10. In a superimposition device according to claim 9 a pair of iris diaphragms positioned one in the optical path of said lens combination and the other in the optical path of said second lens, the pair of diaphragms being coactively connected to obscure one path while unobscuring the other by manual adjustment means.

11. In an optical image superimposition device, a main optical system comprised of a diverging lens and a converging lens, means to coaxially adjust the positions of said lenses, a substantially plane surface positioned in the optical path of and in the focal plane of said lenses upon which surface an image of the field of view of said lenses is formed; an auxiliary optical system comprised of a long focal length converging lens, a converging cylindrical lens and two plane mirrors, means to adjust the position of said long focal lens in the plane perpendicular to the optical axis of said auxiliary optical system, means to incline the optical axis of said long focal lens with respect to said optical axis of the auxiliary system, said cylindrical lens positioned to have non-uniform radial thickness in the vertical plane through said optical axis of said auxiliary optical system and a uniform radial thickness in the horizontal plane through said axis, said mirrors positioned successively obliquely to said optical path in the vertical plane such that said axis reflected by said mirrors impinges upon said surface at an acute angle to the perpendicular thereto, the relation between the inclination of the optical axis of said long focal lens and the magnitude of said acute angle being such that a uniformly focused image of said auxiliary optical system field of view is formed upon said surface, and the focal length of said cylindrical lens being related to the magnitude of said acute angle that said image is geometrically similar to the field of view of said auxiliary system.

12. An image superimposition device comprising a diverging and a converging lens for forming an image of a field of view upon a surface, a second converging lens having a focal length longer than that of the first lens combination for forming an image of a portion of the same field of view, means for adjusting the position of said second converging lens in a plane perpendicular to the optical axis thereof to select a portion of said field of view to be imaged, a third lens having radially asymmetric optical properties in mutually perpendicular planes containing the optical axis defined by said second and third lenses, masking means for limiting the extent of said portion of said field of view positioned to affect the cross-sectional area of the optical path surrounding said optical axis, a reflective element disposed in said optical path, a second reflective element in said path as altered in direction by said first reflective element, said second reflective element positioned with respect to said surface to cause said optical path to impinge upon said surface at an angle other than the normal thereto, the asymmetry of said third lens and the longer focal length of said second converging lens causing an image geometrically similar to the selected portion of said field of view to be formed upon said surface notwithstanding the oblique incidence thereunto.

13. An optical image superimposition device comprising a diverging and a converging lens for forming an inverted image of a field of view upon a substantially plane surface, a second converging lens having a longer focal length than that of the first recited lens combination for forming an image of a portion of the same field of view, means for adjusting the direction of the optical axis of said second converging lens with respect to said field of view, means for adjusting the position of said second converging lens in a plane substantially perpendicular to the optical axis thereof to select a portion of said field of view to be imaged, a cylindrical lens having unlike optical properties in vertical and horizontal planes which contain the optical axis defined by said second converging lens and said cylindrical lens, a mask for limiting the extent of said portion of said field of view positioned to affect the cross-sectional area of the optical path surrounding said optical axis, a reflective element adjustably disposed in said optical path, a second reflective element in said optical path as altered in direction by said first reflective element, said second reflective element positioned with respect to said surface to cause said optical path to impinge upon said surface at an acute angle to the perpendicular thereto, the inclination of the optical axis of said second converging lens and the magnitude of said acute angle being such that a uniformly focused image of the selected portion of said field of view is formed upon said surface, and the focal length of said cylindrical lens being also related to said acute angle that an inverted image geometrically similar to the selected portion of said field of view is obtained.

14. An image superimposition device comprising in order, a diverging lens and a mutually coaxial converging lens, a plane surface perpendicularly disposed to the optical axis defined by said lenses, mechanical means for moving said lenses axially to change the magnification of an image of a field of view formed by said lenses upon said surface while maintaining the focus of said image; in order, means for illuminating a slide, a slide, a mask, a wedge prism, a second converging lens, a third converging lens, a plane mirror and a second plane mirror; said second converging lens adjustable in the plane perpendicular to a second optical axis defined by said second series of optical elements in order for altering the lateral position of the image of said slide, said plane mirrors positioned to twice change the direction of said second optical axis, the final direction being at an acute angle to the perpendicular to said plane surface, the focal lengths of said lenses along said second optical axis being such as to focus an image of said slide upon said plane surface, the included angle between the plane surfaces of said prism being determined by the magnitude of said acute angle as a direct function, the positions of said prism, mirrors and said plane surface being such that the intersection of the plane surfaces of said prism and of the intersections of the planes of said mirrors and said surface, when produced, are mutually parallel lines, the effect of said prism being to predistort the said image of said slide in a manner inverse to the distortion occasioned by oblique incidence upon said surface, to the end that an undistorted and uniformly focused image of said slide may be obtained thereupon.

15. The image superimposition device according to claim 14 wherein said slide, means for illuminating the same and said mask are together connected to a follower, said prism, said second and third converging lenses are together connected to a second follower, a first cam engaging said first follower and a second cam engaging said second follower, common means to drive both said cams synchronously with said mechanical means for moving said lenses, the two recited images formed upon said surface synchronously changing in magnification as though a single image were changing in magnification when said mechanical means is actuated.

16. An image superimposition optical device comprising in order a converging lens, a diverging lens and a second converging lens, all mutually coaxial, a plane surface disposed perpendicularly to the optical axis defined by said lenses, an electric motor, a worm connected thereto, a nut engaging said worm and a cam follower attached to said diverging lens, a pivoted cam resiliently retained in contact with said follower, toothed means for imparting a motion to said second converging lens from said cam of reduced amplitude and opposite direction to the motion of said diverging lens imparted thereto by energizing said motor, said motions increasing the magnification of said image upon said surface when said movable lenses move together; in order, a long focus converging lens, means for manually adjusting said long focus lens in a plane perpendicular to the optical axis thereof, means for adjusting the direction of the optical axis of said long focus lens, means for adjusting the focus of said long focus lens, a cylindrical lens positioned upon the optical axis of said long focus lens, a mask next in order along said axis, a plane mirror for changing the direction of said optical axis, a second plane mirror for again changing said direction oriented with respect to said first mirror and with respect to said surface so that the optical axis of thus altered direction impinges upon said surface at an acute angle with respect to the perpendicular thereto, the direction of the optical axis of said long focus lens being determined by the magnitude of said acute angle as a direct function, the positions of said cylindrical lens, mirrors and of said plane surface being such that the intersection of the surfaces of said cylindrical lens and the intersections of the planes of said mirrors and of said surface, produced, are mutually parallel lines, said cylindrical lens predistorting the image formed by said long focus lens upon said surface in a manner inverse to the distortion occasioned by oblique incidence upon said long focus lens causing said image to be uniformly focused upon said surface.

17. An image superimposition device comprising in order a converging lens, a diverging lens, a second converging lens, all mutually coaxial, a plane surface disposed perpendicularly to the optical axis defined by said lenses, an electrical motor, a worm connected thereto, a nut engaging said worm and a cam follower attached to said diverging lens, a pivoted cam resiliently retained in contact with said follower, toothed means for imparting a motion to said second converging lens from said cam of reduced amplitude and opposite direction to the motion of said diverging lens imparted by energizing said motor, said motions increasing the magnification of said image upon said surface when said movable lenses move together; a slide, a housing for mounting the same containing an electric light source, reflector and diffusing glass for illuminating said slide, electrical means for energizing said light source, a switch and a rheostat connected to said means and to said light source for controlling the intensity of said light source, a mask on the side opposite said light source and within said housing for marking the limits of illumination passing beyond the location of said mask, a wedge prism obliquely positioned in the optical path of said illumination beyond the location of said mask, a converging lens positioned beyond said mask adjustably mounted for movement in two dimensions in a plane perpendicular to the second optical axis defined by said light source, reflector, slide, mask and prism, a lens of plural optical elements having a net converging effect next in order coaxially disposed to said second optical axis, a plane mirror next in order disposed at an angle of more than forty-five degrees to said second optical axis, a second plane mirror next in order disposed to intercept the full cross-section of the optical path surrounding said second optical axis as reflected by said first mentioned mirror, said second mirror oriented with respect to said reflected axis and with respect to said surface so that said reflected axis as again reflected by said second mirror impinges upon said surface at an acute angle with respect to the perpendicular thereto; the included angle between the plane surfaces of said prism and the oblique position thereof being determined by the magnitude of said acute angle, the larger said acute angle the larger said included angle, said position of said prism in said second optical path being such that the intersection of said plane surfaces thereof and of the intersections of the planes of said mirrors, produced, with the plane surfaces of said prism, produced, are parallel lines, and such that the thicker part of said prism is closer to said image surface than the thinner part, said adjustably mounted converging lens having a focal length several times longer than that of said lens of plural optical elements, the adjustment of said adjustably mounted lens resulting in corresponding movement of the image of the slide formed upon said surface by the several optical entities positioned along said second optical axis and the same reflected, the effect of said prism being to predistort the said image of the slide in a manner inverse to the distortion occasioned by the oblique incidence thereof upon said surface, to the end that an undistorted and uniformly focused image of said slide may be obtained thereupon.

18. The image superposition device according to claim 17 wherein said housing is connected to a follower, and said prism, said adjustably mounted converging lens and said lens of plural optical elements are connected together and to a second follower, a camshaft, a cam thereon engaging said follower, said cam having a variable pitch along its operating length, a second cam on said camshaft engaging said second follower, said second cam having a pitch similar to said first cam and producing motion of said second follower in the same direction as said first cam produces in said first follower when said camshaft is revolved, plural meshed gears fastened to plural shafts mechanically connecting said worm and said camshaft for simultaneously revolving both by said motor, the two recited images formed upon said surface synchronously changing in magnification as though a single image were changing in magnification when said motor is energized.

19. An optical image superposition device comprising in order to converging lens, a diverging lens, a second converging lens, all mutually coaxial, a plane surface disposed perpendicularly to the optical axis defined by said lenses, an electric motor, a worm connected thereto, a nut engaging said worm and a cam follower attached to said diverging lens, a pivoted cam resiliently retained in contact with said follower, toothed means for imparting motion to said second converging lens from said cam of reduced amplitude and opposite direction to the motion of said diverging lens imparted by energizing said motor, the magnification of said image upon said surface being increased as said movable lenses move together; a third converging lens, said lens having plural elements and a longer focal length than the combination of the lenses previously recited, manual screw adjusting means for moving said third lens vertically in a plane perpendicular to the optical axis thereof, further similar means for moving said third lens horizontally in said plane, means for altering the direction of the optical axis of said third lens, means for manually focusing said third lens, an iris coaxially positioned on the optical axis of said third lens, means to adjust the opening of said iris, a second iris, said iris coaxially positioned between said diverging and said second converging lenses on the optical axis defined by these said lenses, means to adjust the opening of said second iris, means for optionally connecting said first and said second irises for simultaneous actuation, one said iris opening while the other said iris is closing, a converging cylindrical lens positioned to have a non-uniform radial thickness in the vertical plane through the optical axis of said third lens and a uniform radial thickness in the horizontal plane through said axis, a mask next in turn along said axis for controlling the limits of intensity of the image formed by said third lens, a plane mirror next in turn disposed at an angle of more than forty-five degrees to the optical axis of said third lens, means for adjusting the angle of inclination of said mirror about said stated angle, a second plane mirror next in turn disposed to intercept the full cross-section of the optical path surrounding said third lens optical axis as reflected by said first mentioned mirror, said second mirror oriented with respect to said reflected axis and with respect to said surface so the said reflected optical axis as again reflected by said second mirror impinges upon said surface at an acute angle with respect to the perpendicular thereto; the focal length of said cylindrical lens being determined by the magnitude of said acute angle, the larger said acute angle the shorter said focal length, the position of said cylindrical lens in said third lens optical path being such that the intersection of said surfaces thereof and of the intersections of the planes of said mirrors, produced, with the surfaces of said cylindrical lens, produced, are parallel lines in space, said cylindrical lens predistorting the image formed by said third lens in a manner inverse to the distortion occasioned by the oblique incidence upon said surface, the altered direction of said optical axis of said third lens determined as that value which causes the image formed on said surface to be uniformly focused thereover.

References Cited in the file of this patent

UNITED STATES PATENTS

| | | |
|---|---|---|
| 595,541 | Hollen | Dec. 14, 1897 |
| 1,821,626 | Fleischer | Sept. 1, 1931 |
| 1,945,926 | Tolhurst | Feb. 6, 1934 |
| 2,019,234 | Nistri | Oct. 29, 1935 |
| 2,061,378 | Henze et al. | Nov. 17, 1936 |
| 2,391,450 | Fischer | Dec. 25, 1945 |
| 2,420,198 | Rosenthal | May 6, 1947 |
| 2,532,685 | Walker | Dec. 5, 1950 |
| 2,672,072 | Sachtleben et al. | Mar. 16, 1954 |